United States Patent [19]

Cason

[11] Patent Number: 5,901,219

[45] Date of Patent: May 4, 1999

[54] METHOD FOR RING SIGNAL DETECTION

[75] Inventor: David G. Cason, Palatine, Ill.

[73] Assignee: 3Com Corporation, Santa Clara, Calif.

[21] Appl. No.: 08/921,636

[22] Filed: Aug. 27, 1997

[51] Int. Cl.⁶ .......................... H04M 3/22; G01R 23/165
[52] U.S. Cl. .......................... 379/373; 379/377; 379/382; 379/418; 324/76.44
[58] Field of Search .................... 379/373, 377, 379/382, 379, 418, 372, 290, 361; 324/76.41, 76.44, 76.71

[56] References Cited

U.S. PATENT DOCUMENTS

| | | | |
|---|---|---|---|
| 3,622,711 | 11/1971 | Blashfield | 379/243 |
| 4,349,704 | 9/1982 | Gillis | 379/361 |
| 4,356,618 | 11/1982 | Serrano | 379/372 |
| 4,370,753 | 1/1983 | Ehmke | 455/38.3 |
| 4,496,800 | 1/1985 | Young | 379/9 |
| 5,619,567 | 4/1997 | Apfel | 379/413 |
| 5,636,273 | 6/1997 | Schopfer et al. | 379/412 |
| 5,638,440 | 6/1997 | Nix et al. | 379/412 |
| 5,684,874 | 11/1997 | Yagyu et al. | 379/377 |
| 5,734,712 | 3/1998 | Randahl | 379/377 |
| 5,796,815 | 8/1998 | Guercio et al. | 379/377 |
| 5,809,109 | 9/1998 | Moyal et al. | 379/377 |

*Primary Examiner*—Forester W. Isen
*Assistant Examiner*—Jacques M. Saint-Surin
*Attorney, Agent, or Firm*—McDonnell Boehnen Hulbert & Berghoff

[57] ABSTRACT

A reduced complexity method of ring signal detection, in which a digital signal processor monitors an incoming data stream for zero crossings and employs a limiter-discriminator to differentiate ring frequency signals from line noise. Controlled noise is injected into the incoming data stream in order to prevent false declarations of ring signals in the presence of low frequency natural noise or low amplitude signals. The method conserves valuable processing power and may therefore prove useful in DSP-based telephone devices that must simultaneously perform multiple processing operations such as ring detection and speech processing.

22 Claims, 2 Drawing Sheets

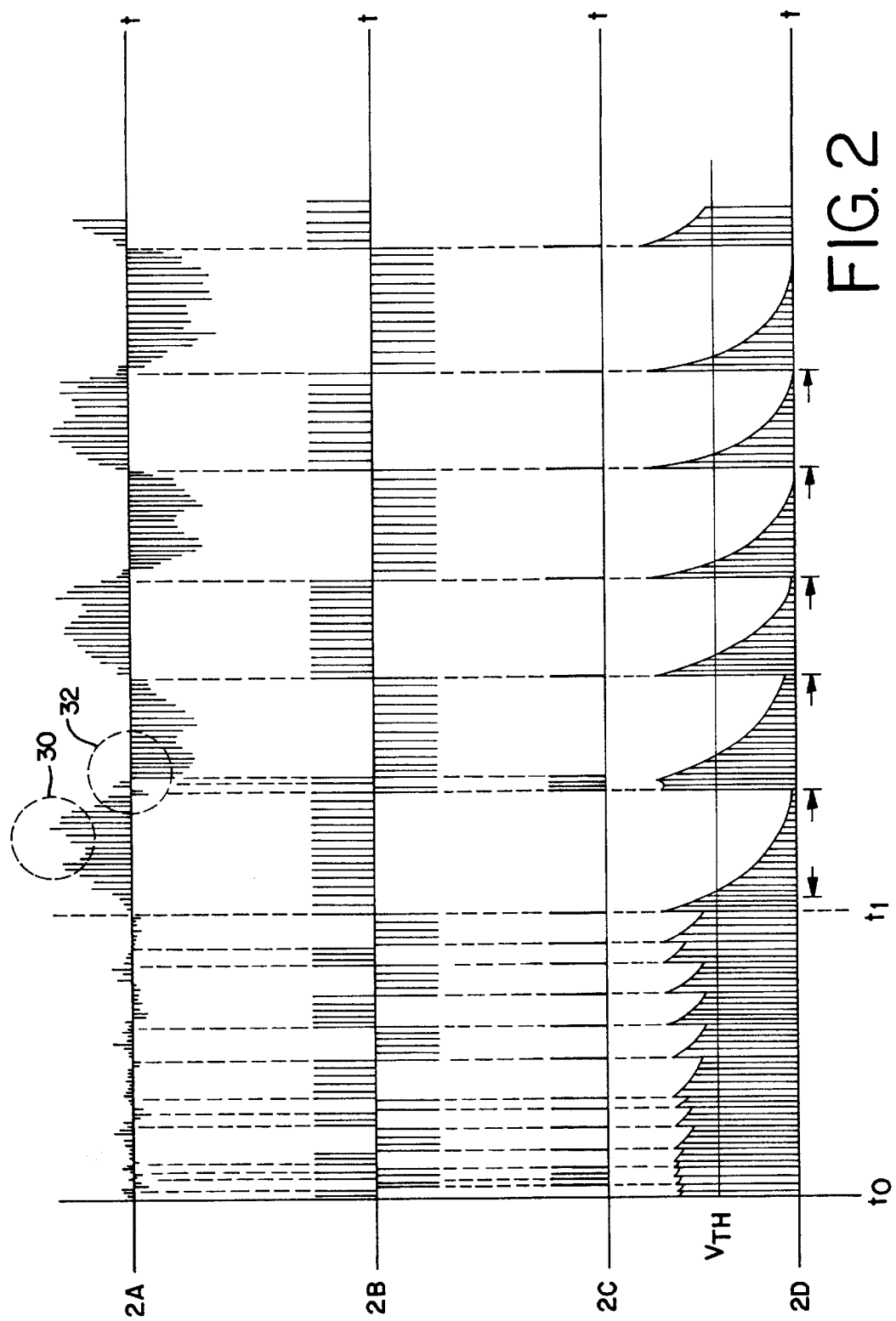

METHOD FOR RING SIGNAL DETECTION

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates to telephone systems and more particularly to the detection ring signals on an incoming telephone line. The invention is particularly beneficial in the context of digital signal processor (DSP) based telephone devices, where processing power is at a premium.

In typical telephone systems, a ring signal or ring tone is generated by a called party's central office and transmitted along a telephone line to a local loop subscriber, to alert the subscriber of an incoming call. The telephone line is usually a twisted pair of copper wires, but may take other forms as well, including, but not limited to, fiber optics, microwave and other wired or wireless connections. Historically, ring signals on these lines were direct current (DC) signals of sufficient voltage to cause analog telephones to ring. By modem convention, a ring signal is an alternating current (AC) signal having a frequency in the range of 14 Hz to 65 Hz (usually about 20 Hz) and an amplitude of at least 22 Volts rms.

In general, any device designed to receive incoming telephone calls must be configured to detect an incoming ring signal while on hook. Modem electronic telephones, for instance, must be able to detect the presence of a ring signal on the incoming phone line in order to recognize when to simulate a ringing sound. Answering machines or computer modems, as additional examples, must be able to detect the presence of a ring signal in order to know when to go off hook to communicate with an incoming call. In any event, these devices must be able to quickly respond to a ring signal that falls within accepted ranges of frequency and amplitude, and to not falsely respond to incoming signals outside of those accepted ranges.

The process of detecting a ring signal is made difficult in part due to the presence of distortions on the incoming telephone line and in the incoming signal. These distortions arise from several sources. Principally, a telephone line naturally carries band limited noise in the range of 300 Hz to 4 kHz. This noise is added to any input signal, including, for instance, a speech signal or a ring signal. In addition, electronic devices connected to public telephone lines in the United States are required by regulation to prevent DC or destructive power surges from entering the network. In most cases, these devices include a line interface circuit having an isolation transformer or other circuitry that is optimized for telephone signals of between 300 Hz and 3.3 kHz and is incapable of passing signals of over 160 Volts peak-to-peak (or about 56 Volts rms). As a consequence, however, the transformer will tend to distort signals having the frequency and/or voltage range of a ring signal, transferring energy from the fundamental harmonic of these signals into second or higher level harmonics.

Modern telephone devices are often DSP based. A DSP chip in these devices may be specially designed and/or programmable and may be configured to perform necessary communication functions, such as tone generation and speech processing, including, for instance, acoustic echo cancellation, modulation and demodulation. Generally speaking, these DSP-based telephone devices detect ring signals by employing either dedicated hard-wired circuitry or complex digital signal processing techniques.

In devices using dedicated hard-wired circuitry to detect ring signals, the ring-detect circuitry typically receives and processes the incoming signal before the signal reaches the isolation transformer and becomes distorted. Such circuitry may include, for instance, a phase locked loop or other mechanism for locking on a signal of a specified frequency. Unfortunately, however, hard-wired circuitry designed to serve a dedicated function such as ring detection is often large and expensive. Additionally, most physical circuit components will degrade as they age, and their performance will diminish. Consequently, such circuitry is not always be able to respond accurately or quickly enough to a proper input signal.

As a result, many DSP-based telephone devices, such as computer modems, are instead configured to detect ring signals through complex digital signal processing techniques. DSP ring detection generally involves passing the incoming signal through a narrow band filter of relatively high Q (selectivity) in search of signals having appreciable energy in the 14 to 65 Hz range, and then subjecting the resulting signal to energy integration and testing code. In this regard, in order to account for the inherent line noise and particularly for the harmonic energy shifts introduced by the line interface circuit, extensive filtering and processing is typically required, sometimes exhausting nearly all of the processing power of the DSP.

Of course, the use of nearly all of the processing power for ring detection may present difficulty in any DSP-based telephone device that must simultaneously detect multiple ringing signals or that must detect a ring signal while simultaneously processing other signals. In a multiple-line phone, for instance, a DSP should be able to detect ring signals simultaneously on all lines. Alternatively, while the DSP is processing speech signals on one line, the DSP should be able to detect ring signals on the other line. Use of substantially all available DSP processing power for ring detection may preclude the inclusion of other commercially desirable features or may necessitate the inclusion of multiple DSP chips, thus increasing manufacturing cost.

In view of these deficiencies, there is a need in the art for a less complex and more robust method of detecting ring signals.

SUMMARY OF THE INVENTION

The present invention provides an improved method of ring signal detection. The present invention does not analyze an incoming signal in search of high energy levels in an acceptable frequency range. Rather, the present invention beneficially monitors the incoming signal in the time domain and identifies a ring signal based on the duration between zero crossings. The invention recognizes that, notwithstanding the distortion caused by line interface circuitry, the number of zero crossings in a valid ring signal generally remains the same.

Absent a valid ring signal, the natural noise present on the line will yield a high number of zero crossings per unit time. In contrast, when a valid ring signal is superimposed with the line noise, the resulting signal will yield a lower number of zero crossings (principally because the ring signal is a higher amplitude, lower frequency signal than the noise). The present invention leverages this difference, to avoid declaring a ring signal in the presence of mere line noise. In turn, the invention beneficially conserves valuable DSP resources by identifying a ring signal in stages, first identifying an incoming signal as a possible ring signal, and only then conducting further processing.

The invention employs a limiter-discriminator, which passes a sample through a low-pass filter in response to each zero crossing of the input signal. The output from the limiter-discriminator decays over time and therefore passes below a designated threshold value if sufficient time passes between zero crossings. The invention identifies a signal as a potential ring signal only if the output of the limiter-discriminator passes below the designated threshold. Additional digital signal processing is not required for ring detection until the output passes this threshold, thereby freeing the DSP to perform other required functions.

Each time the limiter-discriminator output drops below the designated threshold according to the present invention, the DSP counts the time (in the form of a number of digital samples) until the output rises again, indicating another zero crossing in the input signal. If the time DSP counts an appropriate time between edges of the limiter-discriminator output, the invention updates a cycle count. In turn, if a specified number of consecutive cycle counts occur, the DSP concludes that a ring signal is present. Alternatively, if the output of the limiter-discriminator rises above the designated threshold and remains there for a time sufficient to indicate the absence of a ring signal, the DSP returns to simply limiting and discriminating the input signal, again conserving processing power.

These as well as other advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which:

FIG. 2 is a set of graphs illustrating signals flowing through a ring detection system made in accordance with the present invention.

DETAILED DESCRIPTION OF THE PREFERRED EMBODIMENT

Figure 1:
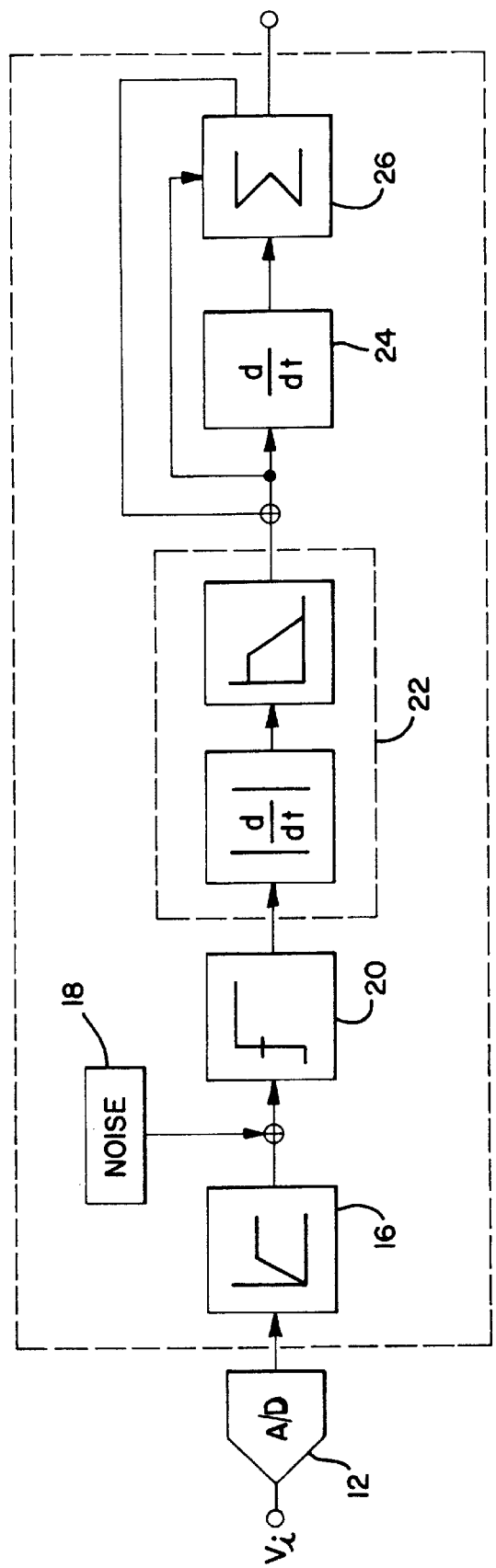
FIG. 1 is a block diagram illustrating the process flow in a ring detection system made in accordance with the present invention.

Referring to drawings, FIG. 1 is a block diagram illustrating the process flow in a preferred embodiment of the present invention. According to the present invention, an analog input signal $V_i$ arrives on an incoming telephone line. The telephone line preferably takes the form of a twisted pair of copper wires, which are traditionally referred to as the tip and ring conductors. As noted above, however, the incoming telephone line may alternatively take other forms, including, for instance, fiber optics, microwave or other wired or wireless connections now known or later developed.

Input signal $V_i$ initially passes to a conventional analog-to-digital (A/D) converter 12, which samples the input signal, encodes the sample amplitudes into digitally expressed values, and sends a data stream of these values to digital signal processor (DSP) 14. While the present invention is not restricted to operation at a specific sampling rate, the A/D converter 12 in the preferred embodiment samples the incoming signal at a rate of 8 kHz. At this rate, a nominal 20 Hz ring signal would conveniently yield 200 samples for every zero crossing.

In the preferred embodiment, DSP 14 is a programmable digital signal processor capable of operating a specified set of machine language instructions. For example, DSP 14 may be the TMS320C52 DSP chip, which is manufactured by Texas Instruments Incorporated of Dallas, Tex. Upon receipt of the digital data stream generated by A/D converter 12, DSP 14 performs a set of machine language instructions configured to monitor the incoming telephone line for the presence of a ring signal in accordance with the present invention.

In particular, DSP 14 first DC blocks the input data stream, as indicated at block 16. DSP 14 then injects controlled noise into the data stream, as indicated at block 18, for reasons that will be discussed below. Next, DSP 14 limits the resulting data stream, as indicated at block 20, to provide a simple square wave having positive unit samples representing positive values in the input stream and negative unit samples representing negative values in the input stream. At block 22, DSP 14 then discriminates the data stream by passing a sample through a low pass filter each time the sign of the data stream changes from positive to negative or from negative to positive. In turn, at block 24, DSP 14 monitors the output of the filter for edges, indicating a zero crossing in the input signal. Finally, as indicated at block 26, DSP 14 counts the number of samples between each edge of the filter output and employs logic to determine whether the number of samples corresponds to a ring signal.

The process employed by DSP 14 will be better understood with reference to FIG. 2, which is a set of timing diagrams illustrating data streams at various stages during processing. Referring to FIG. 2, graph 2A illustrates the output of DC block 16, graph 2B illustrates the output of limiter 20, graph 2C illustrates the input to a low-pass filter of discriminator 22, and graph 2D illustrates the output from discriminator 22.

For purposes of illustration, FIG. 2 depicts a valid ring signal beginning at time $t_1$. Prior to time $t_1$, the incoming telephone line is presumed to carry only low-amplitude band-limited noise in the range of 300 Hz to 4 kHz as discussed above. The valid ring signal beginning at time $t_1$ is combined with this line noise but is of sufficient amplitude in relation to the noise that the noise does not add significant zero crossings. As further discussed above, an isolation transformer or other circuitry in a line interface circuit may have distorted the ring signal, transferring some of the signal energy from the fundamental harmonic into second order or higher harmonics. Consequently, assuming the ring signal was originally a pure sin wave, this distortion would have added fluctuations at or near the peaks of the sin wave.

In the preferred embodiment of the present invention, DSP 14 first blocks any non-zero DC component of the digital data stream, as indicated at block 16 in FIG. 1. Absent this DC block, a non-zero DC component could raise or lower a true ring signal in relation to zero and thereby skew or eliminate zero crossings. In order to accurately monitor the zero crossings of the input signal in accordance with the present invention, DSP 14 eliminates substantially all non-zero DC from the data stream, thus centering the signal about a zero level.

Graph 2A in FIG. 2 illustrates the output from this DC-block as a series of digital sample values. Samples representing low amplitude line noise fluctuate above and below zero until time $t_1$, at which point the digital sample values represent a valid ring signal distorted by the line noise and the line interface circuit. As shown at area 30 in graph 2A, the higher harmonics of the signal generally do not add zero crossings. As shown at area 32 in graph 2A, however, the natural line noise may add one or more zero crossings very close in time to a zero crossing of the higher amplitude ring signal. These added zero crossings are insignificant, as will be described below.

In the preferred embodiment, DSP 14 next passes the data stream through limiter 20 and discriminator 22, to produce an output corresponding to the number of zero crossings in the signal over time. Limiter 20 receives the data stream output from the DC block 16 and produces a limited data stream consisting of a positive unit sample for each positive sample value and a negative unit sample for each negative sample. Graph 2B in FIG. 2 illustrates the limited data stream, which takes the form of a square wave. This limited data stream changes sign from positive to negative or negative to positive each time the original input stream crosses zero.

Discriminator 22, in turn, detects edges representing zero crossings in the limited data stream and passes a unit sample through a low-pass filter in response to each zero crossing. Graph 2C in FIG. 2 illustrates the input to this low-pass filter of discriminator 22, where each sample corresponds in time to a zero crossing of the input signal.

The low-pass filter of discriminator 22 produces a decaying output stream in response to each input sample. Therefore, if consecutive samples are rapidly input to the low-pass filter, the output of the filter will not have a chance to decay significantly. Conversely, if sufficient time passes between input samples, the filter output may decay to near zero. Accordingly, by comparing the output of the low-pass filter to an appropriate threshold value $V_{TH}$, DSP 14 may determine whether sufficient time has passed between input samples—and consequently between zero crossings of the input signal—to indicate the possible presence of a ring signal. In the preferred embodiment, an appropriate threshold value may be 1000 (decimal).

Graph 2D in FIG. 2 illustrates the output from discriminator 22. As shown, prior to time $t_1$, the filter output level repeatedly peaks and begins to decay in response to the quickly fluctuating line noise. Because the zero crossings of the input signal (the line noise) occur so close together in time, the filter output prior to $t_1$ never has a chance to drop below the threshold value $V_{TH}$. In contrast, once the valid ring signal begins, at time $t_1$, the time period between zero crossings increases and accordingly the duration between inputs to the filter of discriminator 22 increases. As a result, the output from discriminator 22 drops below the threshold value $V_{TH}$. In the preferred embodiment, until the filter output drops to below $V_{TH}$, DSP 14 does not detect a ring signal and continues to simply filter the incoming data stream, thereby conserving valuable processing power.

Once the filter output drops below $V_{TH}$, DSP 14 concludes that the input signal is possibly a ring signal. At this point, DSP 14 had merely identified a candidate ring signal and must perform additional processing to determine whether a ring signal is clearly present. To do so, DSP 14 next monitors the filter output for edges (or sharply positive slopes), for instance by taking a first derivative of the output stream as indicated by block 24 in FIG. 1, and counts the number of samples that pass until DSP 14 identifies the next edge of the filter output. If this number of samples corresponds to the range of standard ring frequencies, DSP 14 declares that one half-cycle of a ring has occurred. For this purpose, at the preferred sampling rate of 8 kHz, a ring signal of 13 to 70 Hz should yield anywhere from about 377 to 57 samples per zero crossing (or per half-cycle).

DSP 14 counts the number of consecutive periods that correspond to a valid ring frequency. In the preferred embodiment, when DSP 14 has detected a specified number of consecutive ring cycles, such as three consecutive ring cycles (or six consecutive half-cycles), DSP 14 concludes that a ring signal is clearly present. On the other hand, at any time during this process, if the output from discriminator 22 rises above the threshold value $V_{TH}$ for more than a specified time period, such as 25 milliseconds, DSP 14 concludes that a ring signal is no longer present, and DSP 14 resets its counters and returns to simply filtering the input signal and waiting for the filter output to drop below $V_{TH}$.

Unless and until the filter output rises above $V_{TH}$ for a sufficient time period (25 ms in the preferred embodiment), DSP 14 will continue to wait for three consecutive ring cycles. If, for instance, the discriminator filter output moves below $V_{TH}$ and reaches another edge after 300 more samples, DSP 14 will declare a valid ring cycle. In turn, if the filter output reaches another edge (indicating another zero crossing) 40 samples later, but does not remain above $V_{TH}$ for 25 ms, DSP 14 will reset its counter of the number of valid cycles. If, however, the filter output rises above $V_{TH}$ for at least the specified time period, indicating that the candidate input signal is clearly not a ring signal, DSP 14 will reset its counters and stop counting valid ring cycles.

In addition, in the preferred embodiment, DSP 14 is programmed to disregard insignificant zero crossings that occur near the zero crossings of a candidate ring signal, such as those depicted in area 32 of FIG. 2. To do so, once the discriminator filter output drops below $V_{TH}$ and thereby indicates that a ring signal may be present, DSP 14 is preferably programmed to disregard any zero crossings that occur within a specified small time period of each other. In the preferred embodiment, this time period is 15 (decimal), although it will be appreciated that the present invention is not limited to this specific value.

In contrast to the complex DSP processing required by existing ring-signal detect methods, the present invention thus requires only simple filtering. As the foregoing illustrates, the selectivity of the present invention derives from the time domain rather than the frequency domain. Therefore, the present invention is impervious to harmonic content of the signal or distortion that commonly exists at low frequencies on a telephone line interface. Additionally, in the absence of a valid ring signal, the invention requires only minimal DSP effort. Consequently, the invention will save MIPS (millions of instructions per second) and provide a significant advantage, particularly in telephone devices that need to perform multiple processing operations at once.

In general, the invention described so far serves to detect an incoming signal of a proper ring frequency. When appropriate, the limiter-discriminator output will correspond to at least three consecutive cycles of a ring signal, and the invention will declare a ring signal. On the other hand, in the presence of typical line noise, the invention will not declare a ring signal, because the output of the limiter-discriminator will remain above a threshold value.

In some circumstances, however, experimentation has shown that the natural noise on a telephone line may possess a valid ring signal frequency. Therefore, without further protection, the present invention could be "tricked" into falsely declaring a ring signal. In order to prevent this from happening, DSP 14 beneficially adds an offset signal in the form of controlled noise into the input data stream, as indicated at block 18 in FIG. 1. In the preferred embodiment, this noise is a constant 4 kHz signal, which may be conveniently injected into the 8 kHz sampled data stream by simply inverting every other sample to create zero crossings. It will be appreciated, however, that the present invention is not restricted to this specific frequency for the injected noise. In an alternative embodiment, for instance, the noise may fall within a range of 3.8 kHz to 4.2 kHz. In any event, by adding this high frequency signal to any existing noise on the line, the present invention ensures that the discriminator output will remain above the threshold value $V_{TH}$ and DSP 14 will not falsely declare a ring signal in noise.

Finally, while detecting an incoming signal of a valid ring frequency as described above, the present invention must also be able to detect an incoming signal of valid ring amplitude of at least 22 Volts rms. If the incoming signal has a valid ring frequency but has an amplitude of less than 22 Volts rms, DSP 14 should not falsely declare a ring signal to be present. Conveniently, this condition can be met by setting the noise injected by DSP 14 at a sufficient amplitude that, when the noise is added to an incoming signal less than 22 Volts rms, the combined signal will contain enough zero crossings to maintain the limiter-discriminator output above $V_{TH}$. At the same time, it will be appreciated that the injected noise signal must be of a low enough amplitude to avoid adding a significant number of zero crossings when added to a valid ring signal of over 22 Volts rms.

Through experimentation, it has been determined that a 4 kHz noise signal of 6800 HEX will properly satisfy both of these conditions. By injecting this signal into the data stream (or into the incoming signal), the present invention efficiently prevents false ring signal declarations when the low amplitude line noise approximates a proper ring signal frequency as well as when the incoming signal is too small to be a valid ring signal. As a result, and in view of the features described above, the present invention provides a robust method of detecting the presence of a ring signal on an incoming telephone line.

Although the foregoing description of the preferred embodiment will enable a person of ordinary skill in the art to make and use the invention, the following detailed assembly language listing for a Texas Instruments TMS320C52 DSP is included below. The listing provides detailed information concerning the programming and operation of the present invention. Therefore, additional detailed features of the invention will become apparent to those skilled in the art from reviewing the program.

```
************************************************************************
*       Copyright 1997 David G. Cason, 3Com Corporation
************************************************************************
*       The following are ring detect equates
MAX_PERIOD          .equ    615         ; 13 Hz half cycle length
MIN_PERIOD          .equ    114         ; 70 Hz half cycle length
THRESH              .equ    1000        ; maximum thresh for no ring
MAX_STATE           .equ    5           ; declare ring after 3 full cycles
SET_RING            .equ    05555h      ; prevents multiple detects
HYSTERESIS          .equ    15          ; ignore noise @ zero crossing
FILT_INC            .equ    01000h      ; inc filter @ 0 crossing
DEADBAND_VALUE      .equ    6800h       ; 4KHz noise amplitude
END_RESET           .equ    -200        ; # samps discrim >thresh 4 ring end
************************************************************************
*       Module: ring_det1
*       Author: Dave "Mr. ring detection" Cason
*       Function: This routine processes the incoming line 1 samples
*           searching for a ring signal. Upon detection, the code
*           sets a ring_det bit in control_word3 and continues checking
*           for the end of ringing. Once end of ringing is found, another
*           bit is set in control_word3 for ring_off. In this way, the
*           main loop in audio_st alerts Pstate code that a ring signal
*           was detected. Ring tone is detected by processing zero
*           crossings. Every zero crossing increments a filter input. A
*           20 Hz signal sampled @ 8 KHz only has 1 crossing/200 samples.
*           For no input, the noise has enough crossings to keep the
*           filter output large, but ring signal drops the output. Once
*           below THRESH, any "blips" in the filter output are assumed
*           crossings and the period is calculated. If the period
*           is within the 13 to 70 Hz band & amplitude > 22 Vrms we
*           declare 1 cycle of ring has occurred. After 3 cycles we
*           declare ring detected. When ring ends the noise pushes the
*           output back above THRESH and we start over. This code assumes
*           the AIC internal high pass filter is disabled and the
*           incoming signal is dc blocked by a software filter.
************************************************************************
INIT_RING_DET1
    sst             #0, dbmr
    ldp             #last_line1
    zap
    sac1            last_line1
    sac1            last_up1
    sac1            line1_lo
    splk            #THRESH+1000, line1_up
    retd
    ldp             #0
    1st             #0, dbmr
************************************************************************
*       Process line data
************************************************************************
```

-continued

```
RING_DET1:
    ldp     #line1_in
    zals    samp_cnt
    add     #1
    sac1    samp_cnt                        ; inc sample count
    zalh    line1_in                        ; dc block line_in1
    subh    old_line1
    dmov    line1_in
    addh    line1_high
    adds    line1_low
    sub     line1_high, 9
    sach    line1_high
    sac1    line1_low
    sach    line1_in                        ; restore dc free line_in1
DET_LINE1:
    ldp     #line1_in
    zalh    last_line1                      ; load last sample
    sacb
    bit     samp_cnt, #b0                   ; check lsb of sample count
    lac     _DEADBAND_VALUE, 12             ; load 4 KHZ with pos amp
    xc      2, ntc                          ; If sample count is even . . .
    lac     #-DEADBAND_VALUE, 12            ; load 4KHZ with neg amp
    addh    line1_in                        ; add input sample
    sach    last_line1                      ; update last sample variable
    xorb                                    ; get zero cross (sign changes)
    sac1    line1_in                        ; zero input variable
    xc      2, lt                           ; if zero cross . . .
    splk    #FILT_INC, line1_in             ; input variable = FILT_INC
FILT_L1:
    zalh    line1_up                        ; discriminate incoming signal
    sach    last_up1                        ; (lowpass filter the pulse train
    adds    line1_lo                        ; generated by zero crossings)
    sub     line1_up, 9
    add     line1_in, 9                     ; add input variable (0 or FILT_INC)
    sach    line1_up
    sac1    line1_lo
    lac     line1_up                        ; check for tone signal
    sub     #THRESH                         ; Is discriminator out > THRESH
    bcnd    CHECK_END1, geq                 ; _mp if so . . . else . . .
    splk    _END_RESET, end_timerl          ; reset end of ring timer
DETECT1                                     ; Discriminator out is low
    lac     state1                          ; load ring state variable
    xor     #SET_RING
    bcnd    TASK_LOOP, eq                   ; quit if already got ring
    lac     period1
    add     #1
    sac1    period1                         ; increment period
    lac     line1_up
    sub     last_up1                        ; check for zero crossing
    bcnd    TASK_LOOP, leq                  ; jmp for no crossing
    lac     period1                         ; check period length
    sub     #HYSTERESIS                     ; check for stutter period
    bcnd    TASK_LOOP, lt                   ; quit if stutter period
    lac     old_period1
    add     period1
    sub     #MAX_PERIOD                     ; is period > MAX ?
    dmov    period1                         ; update old_period var
    bcndd   QUIT1, gt                       ; jump if so . . . else . . .
    splk    #0, period1
    add     #MAX_PERIOD                     ; loose MAX_PERIOD in acc
    sub     #MIN_PERIOD                     ; is period < MIN ?
    bcnd    QUIT1, lt
    lac     state1
    add     #1
    sac1    state1                          ; increment ring state
    sub     #MAX_STATE
    bcnd    TASK_LOOP, leq
GOT_RING1
    sach    old_period1                     ; zero out old_period1
    splk    #END_RESET, end_time1           ; reset end of ring timer
    lar     ar0, #control_word3
    op1     #RING_LINE1, *                  ; set the line 1 ring bit
    bd      TASK_LOOP
    splk    #SET_RING, state1               ; set state so we ignore the rest
                                            ; of this ring burst
CHECK_END1
    cp1     #SET_RING, state1               ; if no ring . . .
    bcnd    TASK_LOOP, ntc                  ; get new sample . . . else
    lac     end_time1                       ; dec end of ring timer
    addk    #1
```

```
sac1        end_timer1
bcnd        TASK_LOOP, lt           ; jmp in NOT end of ring
lar         ar0, #control_word3
op1         #RING_OFF1, *           ; set the line 1 ring off bit
call        INIT_RING_DET1          ; reinit line 1 vars
QUIT1
bd          TASK_LOOP
splk        #0, state1              ; reset ring state & QUIT
```

A preferred embodiment of the present invention has been described herein. It is to be understood, of course, that changes and modifications may be made in the embodiment shown without departing from the true scope and spirit of the present invention, as defined by the appended claims. For instance, while the above disclosure describes a digital signal processor operating a set of machine language instructions to perform the present invention, it will be appreciated that the invention may equally extend to a programmable host computer processor or other device executing a set of machine language instructions to perform wave processing and analysis in accordance with the present invention.

What I claim is:

1. A method for detecting a ring signal in a telephone signal carried on an incoming line, said ring signal having a ring frequency within a predetermined ring frequency range and having a ring amplitude within a predetermined ring amplitude range, said method comprising, in combination:

detecting successive zero crossings of said telephone signal;

in response to each successive zero crossing, passing a sample through a low pass filter, said low pass filter producing a filter output;

determining when said filter output drops below a predetermined threshold value;

after said filter output drops below said predetermined threshold value, detecting successive edges in said filter output and measuring a time period between said successive edges; and determining if said time period corresponds to a frequency within said predetermined ring frequency range, whereby, a filter output below said predetermined threshold value indicates a possibility that said telephone signal includes a ring signal, and correspondence between said time period and a frequency within said predetermined ring frequency range indicates that at least one cycle of said telephone signal corresponds to a ring signal.

2. A method as claimed in claim 1, further comprising:

successively measuring time periods between successive edges of said filter output; and determining if a predetermined number of consecutive time periods each correspond to a frequency within said predetermined ring frequency range, whereby, correspondence between said time period and a frequency within said predetermined ring frequency range for said predetermined number of consecutive edges of said filter output indicates a ring signal in said telephone signal.

3. A method as claimed in claim 2, wherein said predetermined number is 6.

4. A method as claimed in claim 2, further comprising restarting a count of said consecutive time periods if said filter output rises above said threshold value and remains above said threshold value for at least a predetermined time period.

5. A method as claimed in claim 4, wherein said predetermined time period is at least about 25 ms.

6. A method as claimed in claim 1, further comprising:

after said filter output drops below said predetermined threshold value, if two consecutive edges in said filter output occur within a predetermined small time period of each other, disregarding one of said two consecutive edges, whereby said one of said two consecutive edges is presumed to be noise riding on a possible ring signal.

7. A method as claimed in claim 6, wherein said predetermined small time period is at most about 15 ms.

8. A method as claimed in claim 1, further comprising:

injecting into said telephone signal an offset signal having an offset frequency higher than said predetermined ring frequency range and having an offset amplitude substantially lower than said predetermined ring amplitude range, whereby (i) absent a ring signal, the offset frequency of said offset signal forces said filter output to remain above said threshold value and (ii) in the presence of a ring signal, said offset signal rides on said ring signal and does not add significant zero crossings to said telephone signal.

9. A method as claimed in claim 8, wherein:

said predetermined ring frequency range is from about 14 Hz to about 65 Hz;

said predetermined ring amplitude range is about 22 Vrms and greater; and said offset frequency is from about 3.8 kHz to about 4.2 kHz.

10. A method as claimed in claim 1, wherein said telephone signal is an analog signal, and further comprising converting said telephone signal to a digital signal.

11. A method as claimed in claim 10, further comprising receiving said digital signal into a digital signal processor (DSP), said DSP (i) detecting said successive zero crossings of said telephone signal, (ii) in response to each successive zero crossing, passing said sample through said low pass filter, (iii) determining when said filter output drops below said predetermined threshold value, (iv) after said filter output drops below said predetermined threshold value, detecting successive edges in said filter output and measuring said time period between said successive edges, and (v) determining if said time period corresponds to a frequency within said predetermined ring frequency range.

12. A method as claimed in claim 10, further comprising removing a non-zero DC component from said digital signal.

13. A method as claimed in claim 12, comprising applying a limiter and a discriminator to said digital signal, whereby said limiter substantially converts said digital signal to a square wave, and said discriminator low pass filters a sample in response to each zero crossing of said square wave.

14. A method as claimed in claim 13, wherein detecting successive edges in said filter output comprises taking a first derivative of said filter output.

15. A method as claimed in claim 13, wherein measuring a time period between said successive edges in said filter output comprises counting samples between said successive edges.

16. A method as claim 15, wherein said predetermined ring frequency range is from about 14 Hz to about 65 Hz.

17. A method as claimed in claim 15, wherein said predetermined ring amplitude range is about 22 Vrms and greater.

18. A method as claimed in claim 13, further comprising:
said DSP injecting into said telephone signal an offset signal having an offset frequency higher than said predetermined ring frequency range and having an offset amplitude substantially lower than said predetermined ring amplitude range,
whereby (i) absent a ring signal, the offset frequency of said offset signal forces said filter output to remain above said threshold value and (ii) in the presence of a ring signal, said offset signal rides on said ring signal and does not add significant zero crossings to said telephone signal.

19. A method as claimed in claim 18, wherein:
said predetermined ring frequency range is from about 14 Hz to about 65 Hz;
said predetermined ring amplitude range is about 22 Vrms and greater; and
said offset frequency is from about 3.8 kHz to about 4.2 kHz.

20. A method as claimed in claim 19, wherein said offset frequency is about 4 kHz.

21. A method for detecting a ring signal in an analog telephone signal carried on an incoming line, said ring signal having a ring frequency within a predetermined ring frequency range of about 14 Hz to about 65 Hz and having a ring amplitude within a predetermined ring amplitude range of at least about 22 Vrms, said method comprising, in combination:

converting said analog telephone signal to a digital signal;

receiving said digital signal in a digital signal processor;

detecting successive zero crossings of said digital signal;

in response to each successive zero crossing, passing a sample through a low pass filter, said low pass filter producing a filter output;

determining when said filter output drops below a predetermined threshold value;

after said filter output drops below said predetermined threshold value, detecting successive edges in said filter output and successively measuring time periods between said successive edges;

determining if a predetermined number of consecutive time periods each correspond to a frequency within said predetermined ring frequency range;

whereby, correspondence between consecutive time periods and said frequency within said predetermined ring frequency range for a predetermined number of consecutive edges of said filter output indicates a ring signal in said telephone signal.

22. A method as claimed in claim 21, further comprising
injecting into said telephone signal an offset signal having an offset frequency higher than said predetermined ring frequency range and having an offset amplitude substantially lower than said predetermined ring amplitude range,
whereby (i) absent a ring signal, the offset frequency of said offset signal forces said filter output to remain above said threshold value and (ii) in the presence of a ring signal, said offset signal rides on said ring signal and does not add significant zero crossings to said telephone signal.

* * * * *